US012417185B2

(12) United States Patent
Tsirkin

(10) Patent No.: US 12,417,185 B2
(45) Date of Patent: Sep. 16, 2025

(54) DYNAMIC DIRECT MEMORY ACCESS MAPPING FOR PERIPHERAL DEVICES

(71) Applicant: Red Hat, Inc., Raleigh, NC (US)

(72) Inventor: Michael Tsirkin, Yokneam Illit (IL)

(73) Assignee: Red Hat, Inc., Raleigh, NC (US)

( * ) Notice: Subject to any disclaimer, the term of this patent is extended or adjusted under 35 U.S.C. 154(b) by 17 days.

(21) Appl. No.: 18/302,540

(22) Filed: Apr. 18, 2023

(65) Prior Publication Data

US 2024/0354261 A1 Oct. 24, 2024

(51) Int. Cl.
*G06F 12/1081* (2016.01)
*G06F 12/1009* (2016.01)

(52) U.S. Cl.
CPC ...... *G06F 12/1081* (2013.01); *G06F 12/1009* (2013.01)

(58) Field of Classification Search
CPC ............. G06F 12/1081; G06F 12/1009; G06F 12/0808; G06F 13/28; G06F 2212/1016; G06F 2212/1032; G06F 2212/151; G06F 2212/651; G06F 2212/652
See application file for complete search history.

(56) References Cited

U.S. PATENT DOCUMENTS

| | | | | |
|---|---|---|---|---|
| 10,120,709 | B2 | 11/2018 | Tsirkin et al. | |
| 2008/0215768 | A1 | 9/2008 | Reid et al. | |
| 2014/0365745 | A1 | 12/2014 | Colgrove et al. | |
| 2020/0042485 | A1 | 2/2020 | Williamson et al. | |
| 2022/0107886 | A1 | 4/2022 | Palmer | |
| 2022/0417206 | A1 * | 12/2022 | Christidis | G06F 12/0873 |
| 2023/0205705 | A1 * | 6/2023 | Poremba | G06F 15/7821 711/203 |
| 2023/0376422 | A1 * | 11/2023 | Watanabe | G06F 12/10 |

* cited by examiner

*Primary Examiner* — Francisco A Grullon
(74) *Attorney, Agent, or Firm* — Dority & Manning, P.A.

(57) ABSTRACT

The technology disclosed herein enables receiving, by an operating system running on a host computer system, a request to map a physical address associated with a peripheral device, identifying, based on the request, a mapping type, wherein the mapping type is one of: a first mapping type or a second mapping type, mapping, based on the mapping type of the request, the physical address to a virtual address referencing a memory page having one of: a first page size or a second page size, wherein the second page size exceeds the first page size, and storing a mapping of physical address to the virtual address in an input/output memory management unit (IOMMU) page table associated with the peripheral device.

12 Claims, 5 Drawing Sheets

DYNAMIC DIRECT MEMORY ACCESS MAPPING FOR PERIPHERAL DEVICES

TECHNICAL FIELD

The present disclosure is generally related to continuous integration, and more particularly, to the dynamic direct memory access mapping for peripheral devices.

BACKGROUND

Virtualization is a computing technique that improves system utilization, decoupling applications from the underlying hardware, and enhancing workload mobility and protection. Virtualization can abstract some physical components into logical objects in order to allow running various software modules, for example, multiple operating systems, concurrently and in isolation from other software modules, on one or more interconnected physical computer systems. Virtualization may be realized through the implementation of virtual machines (VMs). A VM is a portion of software that, when executed on appropriate hardware, creates an environment allowing the virtualization of a physical computer system (e.g., a server, a mainframe computer, etc.). The physical computer system can be referred to as a "host machine," and the operating system of the host machine can be referred to as the "host operating system." A virtual machine may function as a self-contained platform, executing its own "guest" operating system and software applications.

Software operating as a layer above the hardware and below the virtual machines on the host machine can be referred to as a "hypervisor" (or a "virtual machine monitor") that can manage the execution of one or more virtual machines by providing a variety of functions such as virtualizing and allocating resources and context switching among virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization can be performed by having the hypervisor schedule time slots on one or more physical processors for a virtual machine without dedicating an entire physical processor exclusively to a single virtual machine. Memory virtualization can be achieved by utilizing a page table (PT) which is a data structure that can be used for translating virtual memory addresses to physical memory addresses or for translating guest memory addresses to host memory addresses. Device and input/output (I/O)) virtualization can include managing the routing of I/O requests between virtual devices and the shared physical hardware.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
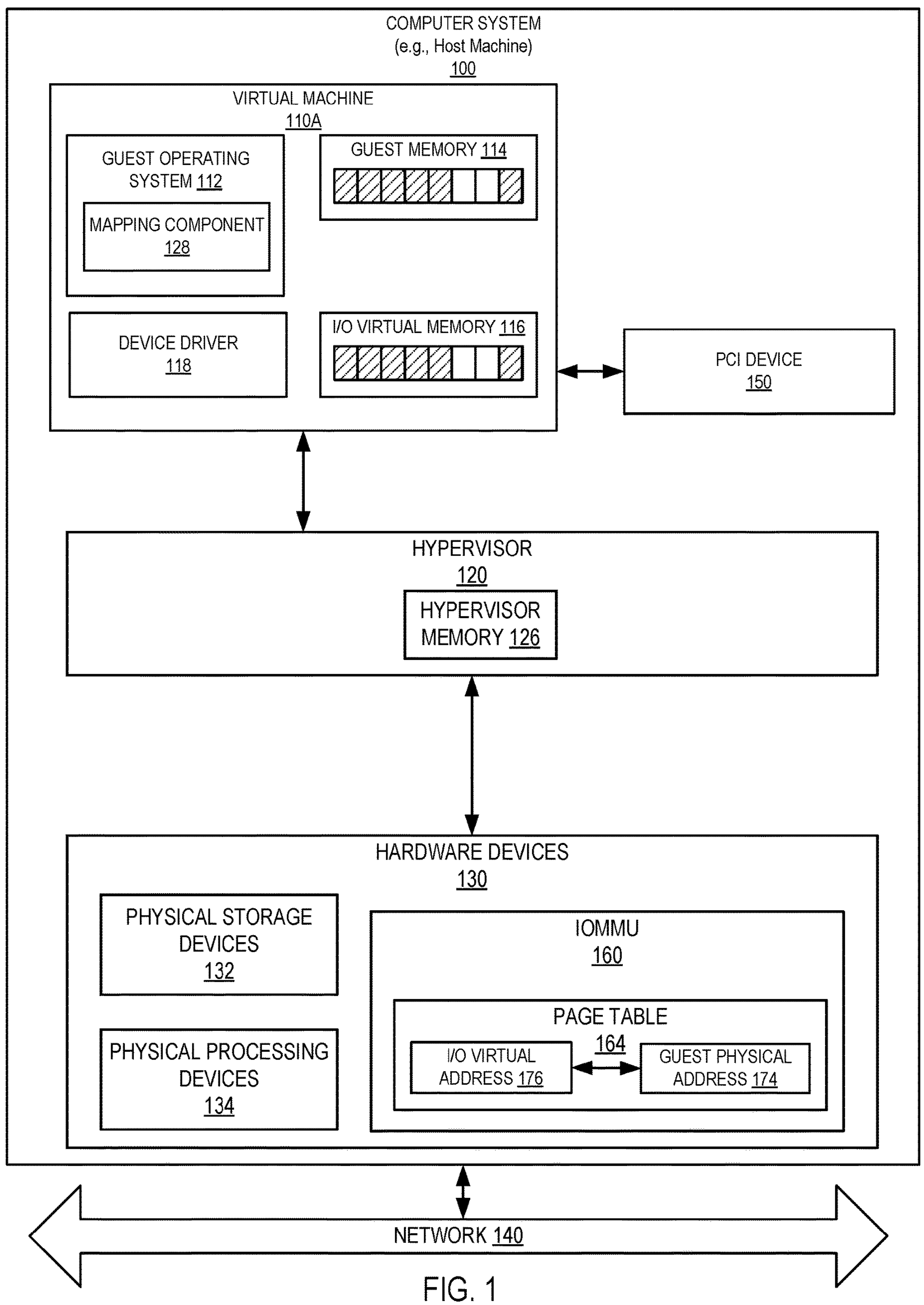
FIG. 1 depicts a high-level block diagram of an example computing environment that performs dynamic direct memory access mapping, in accordance with one or more aspects of the present disclosure.

Described herein are methods and systems for dynamic direct memory access mapping. Peripheral Component Interconnect (PCI) device is an external computer hardware device that connects to a computer system and is capable of direct memory access (DMA). DMA allows a peripheral device to access the system memory for reading and/or writing independently of the central processing unit (CPU). PCI devices that are capable of performing DMA include disk drive controllers, graphics cards, network cards, sound cards, etc. While a hardware device is performing the DMA, the CPU can engage in other operations. A computer system having DMA-capable devices often uses an input/output memory management unit (IOMMU) to manage address translations.

IOMMU is a hardware memory management unit (MMU) that resides on the input/output (I/O) path connecting the device to the memory. The IOMMU brokers incoming DMA requests on behalf of an I/O device (e.g., PCI device) by translating, using an IOMMU page table, the virtual address referenced by the I/O device to a physical address similar to the translation process performed by the MMU of a CPU. The virtual address referenced by the I/O device is requested from an operating system by a device driver associated with the I/O device and passed to the I/O device.

In some systems, DMA requests may use a single virtual address. An entry of the IOMMU page table (e.g., page table entry) stores the translation of the single virtual address to a physical address associated with a standard memory page. The standard memory page is a contiguous portion of memory of a certain size (e.g., 4 KB). Page table in which each entry includes translation from a virtual address to a physical address associated with a standard memory page may result in a large page table size. Accordingly, a page table architecture may be implemented in which multiple portions of the virtual address are used to traverse the page table, thereby reducing the size of the page table. However, the more levels that need to be traversed to translate the virtual address to a physical address, the more performance suffers.

Some systems address performance issues using a single virtual address for multiple DMA requests. A page table entry stores the translation of the single virtual address to a physical address associated with a huge memory page (e.g., a huge page). The huge page is a memory page or a contiguous portion of memory of a certain size (e.g., 2 MB or 1 GB). The huge page store data is associated with multiple DMA requests. The use of huge pages improves performance for certain workloads by reducing the number of steps for translation. However, since multiple DMA requests share a single virtual address, a page table entry associated with a DMA request of multiple DMA requests may not be invalidated. The page table entry may stay valid for an extended period of time. I/O devices may unintentionally access the memory page associated with the virtual address and corrupt the data. As a result, stability and security are compromised.

Aspects of the present disclosure address the above-noted and other deficiencies by dynamically selecting a page size of a virtual address to be mapped to physical address(es). For example, device driver (e.g., driver) may request a virtual address to be mapped to a physical address. The driver may provide a flag with each address indicating a type of mapping. The driver may indicate that the data associated with mapping the virtual address to a physical address may be accessible by both driver and I/O device (synchronous mapping type) or solely accessible by the I/O device (asynchronous mapping type). For synchronous mapping types, a virtual address referencing a memory page with a standard size may be mapped to the physical address. For asynchronous mapping types, a virtual address referencing a memory page with a huge page size may be mapped to the physical address. Multiple physical addresses, each identified in multiple requests of asynchronous mapping type, may be batched together and mapped to a virtual address referencing a memory page with a huge page size. The device driver may request mapping of the same physical address multiple times. Each mapping is stored in a page table of the IOMMU for future translation.

Advantages of the present disclosure include, but are not limited to, improving translation performance for memory pages accessible by the device, while maintaining security for translation for memory pages accessible by both the device driver and device, thus improving overall stability and performance for direct memory access.

FIG. 1 depicts an illustrative architecture of elements of a computer system 100, in accordance with an embodiment of the present disclosure. It should be noted that other architectures for computer system 100 are possible, and that the implementation of a computing device utilizing embodiments of the disclosure are not necessarily limited to the specific architecture depicted. Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computer system 100 may be a computing device implemented with x86 hardware. In another example, computer system 100 may be a computing device implemented with PowerPC®, SPARC®, or other hardware. In the example shown in FIG. 1, computer system 100 may include virtual machines 110, hypervisors 120, hardware devices 130, a network 140, and a Peripheral Component Interconnect (PCI) device 150.

Virtual machine 110 may execute guest executable code that uses an underlying emulation of the physical resources. The guest executable code may include a guest operating system, guest applications, guest device drivers, etc. Virtual machine 110 may support hardware emulation, full virtualization, para-virtualization, operating system-level virtualization, or a combination thereof. Virtual machine 110 may have the same or different types of guest operating systems, such as Microsoft®, Windows®, Linux®, Solaris®, etc. Virtual machine 110 may execute guest operating system 112 that manages guest memory 114 and I/O virtual memory 116.

Guest memory 114 may be any virtual memory, logical memory, physical memory, other portion of memory, or a combination thereof for storing, organizing, or accessing data. Guest memory 114 may represent the portion of memory that is designated by hypervisor 120 for use by virtual machine 110. Guest memory 114 may be managed by guest operating system 112 and may be segmented into guest pages. The guest pages may each include a contiguous or non-contiguous sequence of bytes or bits and may have a page size that is the same or different from a memory page size used by hypervisor 120. Each of the guest page sizes may be a fixed-size, such as a particular integer value (e.g., 4 KB, 2 MB) or may be a variable-size that varies within a range of integer values.

I/O virtual memory 116 may be a virtual address space created by device driver 118 for use by PCI device 150. Device driver 118 may be any type of virtual or physical device driver, such as, for example, a vCPU driver. In an example, device driver 118 may be utilized for creating I/O virtual memory 116. In another example, device driver 118 may be utilized for communicating with IOMMU 160 and generating records in page table 164 of IOMMU 160, where each record maps an I/O virtual address 176 of the I/O virtual memory 116 to a guest physical address 174 of guest memory 114. The features provided by device driver 118 may be integrated into the operations performed by guest operating system 112.

Hypervisor memory 126 (e.g., host memory) may be the same or similar to the guest memory but may be managed by hypervisor 120, instead of a guest operating system. Hypervisor memory 126 may be segmented into guest pages, which may be in different states. The states may correspond to unallocated memory, memory allocated to guests. The unallocated memory may be guest memory pages that have not yet been allocated by hypervisor memory 126 or were previously allocated by hypervisor 120 and have since been deallocated (e.g., freed) by hypervisor 120. The memory allocated to guests may be a portion of hypervisor memory 126 that has been allocated by hypervisor 120 to virtual machine 110 and corresponds to guest memory of virtual machine 114. Other portions of hypervisor memory may be allocated for use by hypervisor 120, a host operating system, hardware device, other module, or a combination thereof.

Hypervisor 120 may provide virtual machines 110 with access to one or more features of the underlying hardware devices 130. In the example shown, hypervisor 120 may run directly on the hardware of computer system 100 (e.g., bare metal hypervisor). In other examples, hypervisor 120 may run on or within a host operating system (not shown). Hypervisor 120 may manage system resources, including access to hardware devices 130.

Hardware devices 130 may provide hardware resources and functionality for performing computing tasks. Hardware devices 130 may include one or more physical storage devices 132, one or more physical processing devices 134, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks. Physical processing devices 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

IOMMU 160 may manage address translations in response to receiving memory access requests, interrupt requests, or any other data requests and/or commands. IOMMU 160 may include page table 164. Page table 164 may be a data structure used to store a mapping of addresses of the I/O memory to addresses of the guest memory (e.g., hypervisor memory 126). Accordingly, address translation is handled using the page table 164. In particular, page table 164 may translate I/O virtual addresses 176 of I/O virtual memory 116 pages to guest physical addresses 174 of guest memory 114 pages.

In some embodiments, IOMMU 160 may be a virtual device. For example, hypervisor 120 may create a virtual device having an IOMMU and expose the virtual device to the virtual machines via an appropriate virtual device driver. The virtual device may have no associated hardware, and the IOMMU functionality may be implemented by a hypervisor module that communicates with the virtual device driver.

PCI device 150 may be a computer hardware device that plugs directly into a PCI slot of the computer system 100. PCI device 150 may be assigned to the guest operation system 112 of the virtual machine 110 and may communicate with the guest operation system 112. PCI device 150 may include DMA (direct memory access) capabilities, which allow PCI device 150 to access system memory (e.g., physical storage devices 132) for reading and/or writing independently of a system CPU (e.g., physical processing devices 134). For example, the PCI device 150 may transfer its input/output (I/O) data directly to and from physical storage devices 132.

Network 140 may be a public network (e.g., the Internet), a private network (e.g., a local area network (LAN), a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Guest operating system 112 may include mapping component 128 for dynamic direct memory access mapping for peripheral devices. For example, based on a type of mapping request received by the mapping component 128, a virtual address of a specific size is mapped to a guest physical address associated with a peripheral device 150. Mapping component 128 refers to a software component implemented by one or more software modules, each module associated with a set of executable instructions. Furthermore, designation of the mapping component 128 is purely functional, i.e., mapping component 128 may be an integral part of the executable code of guest operating system 112.

Mapping component 128 may receive requests from device driver 118 to map I/O virtual addresses (of I/O virtual memory 116) to guest physical addresses (of guest memory 114) associated with PCI 150 (e.g., mapping requests). Mapping the I/O virtual addresses to guest physical addresses includes obtaining the I/O virtual addresses for the guest physical addresses identified in the mapping request.

In some embodiments, the device driver 118 may transmit to mapping component 128 a bit flag with each request. The bit flag (e.g., a mapping flag) indicates a type of request (e.g., mapping type). The mapping type may be synchronous (e.g., synchronous mapping type) if the bit flag is set to a value of "0." The mapping type may be asynchronous (e.g., asynchronous mapping type) if the bit flag is set to a value of "1." Synchronous mapping type refers to a type of mapping that provides device driver 118 and PCI device 150 access to data associated with the mapping and thus are long-lived. Asynchronous mapping refers to a type of mapping that solely provides PCI device 150 access to data associated with the mapping. Access to the data associated with the mapping is accessible by the device driver 118 once the mapping is unmapped (or invalidated) and thus is short-lived.

Mapping component 128 may determine a mapping type for each request received. If the mapping type of the request is a synchronous mapping type (e.g., synchronous mapping request), mapping component 128 may obtain an I/O virtual address referencing a memory page with a standard page size (e.g., 4 KB) to map to the guest physical address associated with PCI 150 referenced by the synchronous mapping request.

Depending on the embodiment, during start-up of the PCI device 150, the guest operating system 112 may map I/O virtual addresses to guest physical addresses associated with PCI 150. More specifically, an I/O virtual address referencing a memory page with a standard page size is mapped to each guest physical address associated with PCI 150.

Accordingly, prior to executing a synchronous mapping request, mapping component 128 may determine if any previous mappings are associated with the guest physical address referenced by the mapping request. If any previous synchronous mapping requests are associated with the guest physical address referenced by the mapping request, mapping component 128 may ignore the mapping request.

If the mapping type of the mapping request is an asynchronous mapping type (e.g., asynchronous mapping request), mapping component 128 may obtain an I/O virtual address of I/O virtual memory 116 referencing a memory page having a huge page size (e.g., 2 MB or 1 GB) to map a guest physical address associated with PCI 150 referenced by the asynchronous mapping request. Mapping component 128 may map the I/O virtual address to the guest physical address. In some embodiments, mapping component 128 may fulfill the asynchronous mapping request regardless of any previous mappings associated with the guest physical address referenced by the mapping request.

Depending on the embodiment, mapping component 128 may group multiple mapping requests into a single mapping. For example, mapping component 128 may receive, from the device driver 118, each with a mapping flag indicating the mapping request of an asynchronous mapping type (e.g., multiple asynchronous mapping requests). Mapping component 128 may obtain an I/O virtual address of I/O virtual memory 116 referencing a memory page having a huge page size (e.g., 2 MB or 1 GB). Accordingly, based on the huge page size of the memory page, a single mapping may map the I/O virtual address to multiple guest physical addresses referenced by the multiple asynchronous mapping requests.

In one embodiment, the number of multiple asynchronous mapping requests that may be batched together is based on the size of the memory page referenced by the I/O virtual address (e.g., huge page size). In particular, the guest physical address of each of multiple asynchronous mapping requests references a memory page with a specified size (e.g., guest physical memory page size). Thus, the number of multiple asynchronous mapping requests that may be batched together is the huge page size divided by the guest physical memory page size (e.g., maximum number of mapping request). In another embodiment, the number of multiple asynchronous mapping requests that may be batched together is a predetermined number (e.g., 16). The predetermined number may be any value that does not exceed the maximum number of mapping request.

Each mapping of an I/O virtual address to multiple guest physical addresses may also include a counter (e.g., mappings counter). The mappings counter indicates the number of multiple asynchronous mapping requests that were batched together in the mapping.

Mapping component 128 generates for each mapping (e.g., an I/O virtual address mapped to at least one guest physical address) a record in page table 164 of IOMMU 160. Mapping component 128 may receive from the device driver 118 a request to unmap an I/O virtual addresses mapped to guest physical addresses associated with PCI 150 (e.g., unmapping request). In some embodiments, mapping component 128 may identify, from page table 164 of IOMMU 160, at least one record associated with the guest physical address referenced by the unmapping request (e.g., mapping of the I/O virtual address to the guest physical address). Mapping component 128, for each of the at least one record, determines whether the I/O virtual address of a respective record maps to more than one guest physical address by analyzing a page size of the memory page associated with the I/O virtual address. If mapping component 128 determines that the memory page size associated with the I/O virtual address of the respective record is a huge page size, mapping component 128 unmaps the I/O virtual address of the respective record from the guest physical address associated with the unmapping request. Mapping component 128 may invalidate the respective record once each guest physical address of the mapping associated with the respective record is unmapped. Mapping component 128 reduces a mappings counter associated with the mapping associated with the respective record each time a guest physical address of the mapping associated with the respective record is unmapped. Once the mappings counter reaches 0, mapping component 128 invalidates the respective record.

Figure 2:
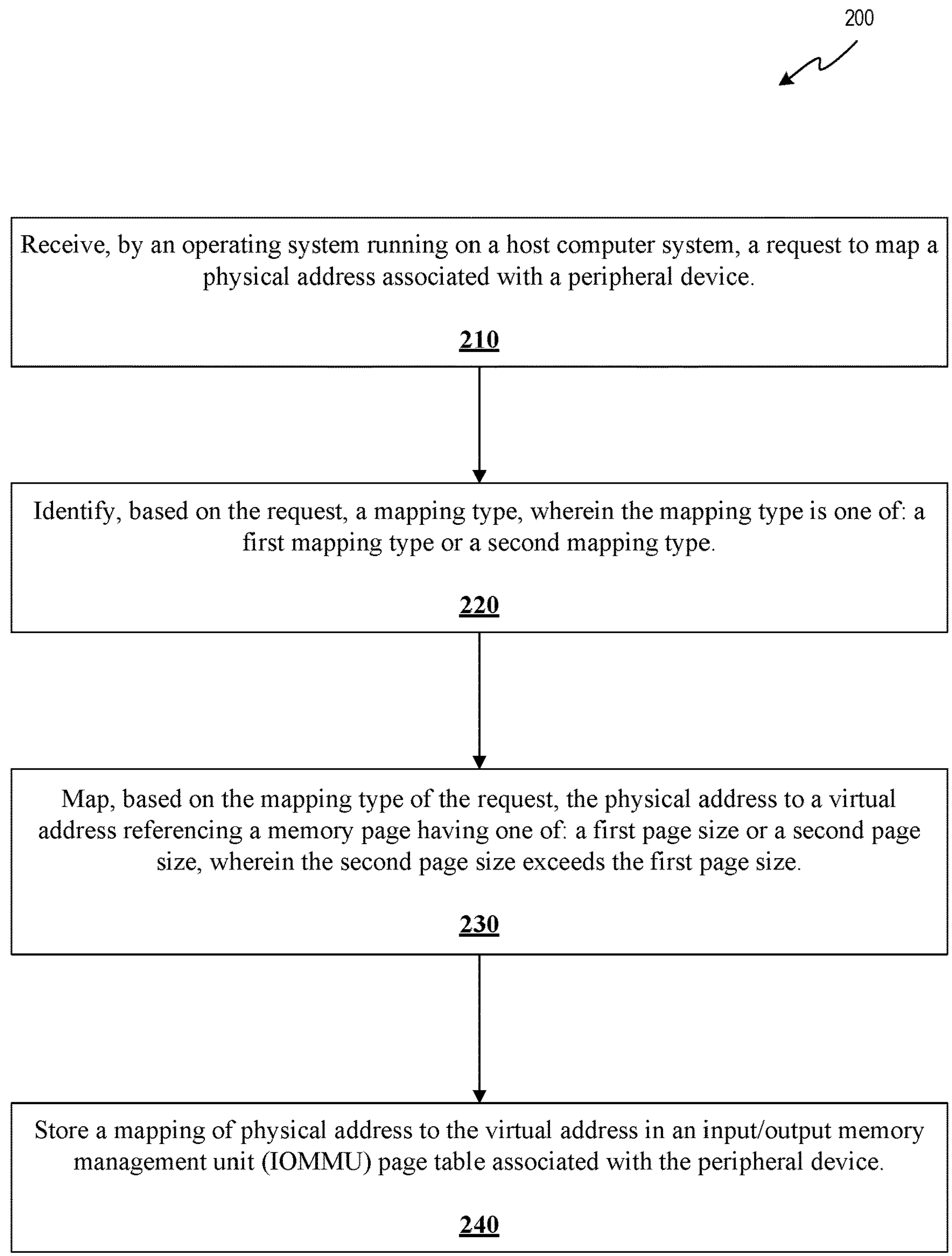
FIG. 2 depicts a flow diagram of an example method for dynamic direct memory access mapping, in accordance with one or more aspects of the present disclosure.

FIG. 2 depicts a flow diagram of an illustrative example of a method 200 for dynamic direct memory access mapping, in accordance with one or more aspects of the present disclosure. Method 200 and each of its individual functions, routines, subroutines, or operations may be performed by one or more processors of the computer device executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by a device driver as shown in FIG. 1 or by an executable code of a host machine (e.g., host operating system or firmware), a virtual machine (e.g., guest operating system or virtual firmware), other executable code, or a combination thereof.

Method 200 may be performed by processing devices of a virtual machine or a device driver and may begin at block 210. At block 210, the processing device receives, by an operating system running on a host computer system, a request to map a physical address (e.g., a guest physical address of guest memory) associated with a peripheral device (e.g., a mapping request).

At block 220, the processing device identifies, based on the request, a mapping type. The mapping type may be a first mapping type (e.g., synchronous mapping type) or a second mapping type (e.g., asynchronous mapping type). The request to map the physical address may include a mapping flag indicating the mapping type. As previously described, the synchronous mapping type refers to a type of mapping that provides device driver and PCI device access to data associated with the mapping, and asynchronous mapping refers to a type of mapping that solely provides PCI device access to data associated with the mapping. Access to the data associated with the mapping of asynchronous mapping type is accessible by the device driver once the mapping is unmapped (or invalidated).

At block 230, the processing device maps, based on the mapping type of the request, the physical address (e.g., a guest physical address of guest memory) to a virtual address (e.g., an I/O virtual address of an I/O virtual memory) referencing a memory page having one of a first page size (e.g., 4 kilobyte) or a second page size (e.g., 1 gigabyte). The second page size may exceed the first page size. As previously described, for a mapping of synchronous mapping type the physical address is mapped to the virtual address referencing the memory page having the first page size. For a mapping of asynchronous mapping type, the physical address is mapped to the virtual address referencing the memory page having the second page size. Mapping of asynchronous mapping type may include mapping multiple physical addresses to a single virtual address.

At block 240, the processing device stores mapping of physical address to the virtual address in an input/output memory management unit (IOMMU) page table associated with the peripheral device.

Depending on the embodiment, the processing device may receive a request to unmap the physical address. The physical address may be mapped to a plurality of virtual addresses. The processing device may identify, from the IOMMU page table, at least one mapping (or record) in which the physical address is mapped to a virtual address referencing a memory page having a second page size. As previously described, the processing device may determine whether the memory page being referenced by the virtual address is a huge page size. In other embodiments, since each mapping that maps a virtual address to a plurality of physical address includes a mappings counter, the processing device may identify the records associated with the physical address that includes a mapping counter.

The processing device may invalidate, in the IOMMU page table, the at least one mapping. As previously described, to invalidate the at least one mapping, the processing device must receive an unmapping request for each physical address associated with the at least one mapping and decrease the mappings counter. Once the mappings counter reaches zero, the processing device may then invalidate the at least one mapping.

Figure 3:
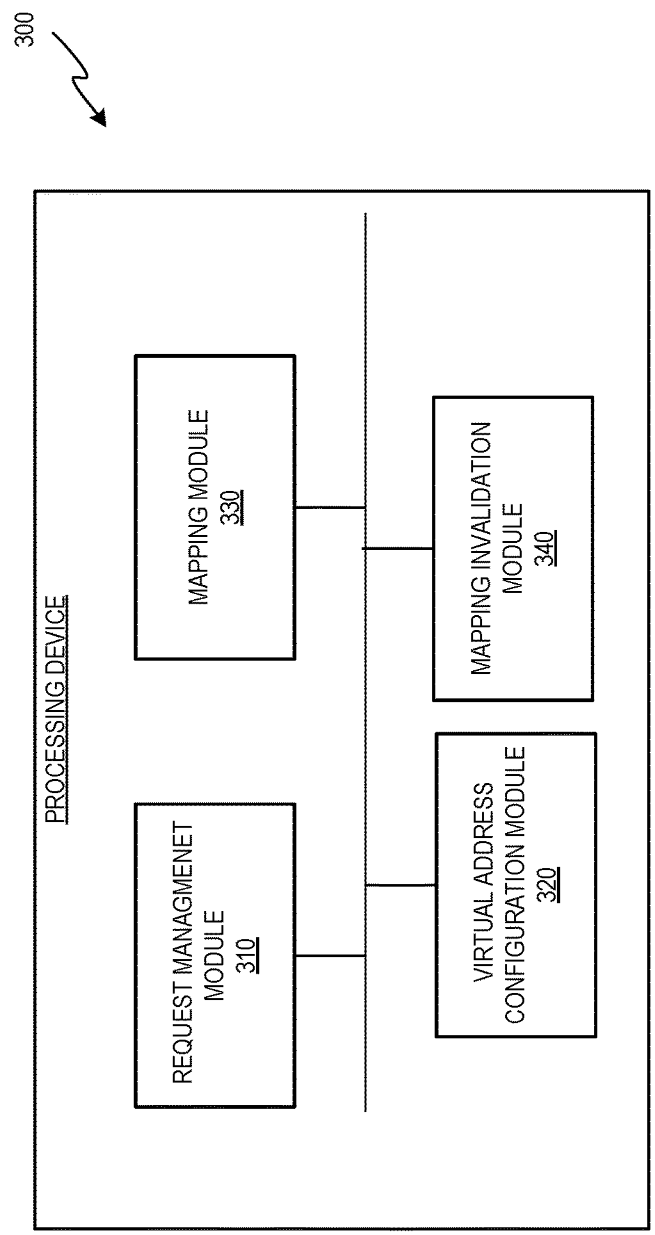
FIG. 3 depicts a block diagram of a computer system operating in accordance with one or more aspects of the present disclosure.

FIG. 3 depicts a block diagram of a system 300 operating in accordance with one or more aspects of the present disclosure. System 300 may be the same or similar to the system 100 and may include one or more processing devices and one or more memory devices. In the example shown, system 300 may include a request management module 310, a virtual address configuration module 320, a mapping module 330, and a mapping invalidation module 340.

Request management module 310 may receive, from a device driver (e.g., similar to device driver 118 of FIG. 1), a request (e.g., a mapping request) to map a virtual address (e.g., I/O virtual address of virtual memory of a virtual machine (VM)) to a guest physical address (e.g., a guest physical address of guest memory of VM). The mapping request received by the request management module 310 may include a mapping flag indicating the type of mapping request. Request management module 310 may determine that the mapping request is a synchronous mapping request, if the mapping flag is set to "1", or an asynchronous mapping request, if the mapping flag is set to "0". Request management module 310 transmits to the virtual address configuration module 320, an indication of the type of mapping request (e.g., synchronous mapping request or asynchronous mapping request). Additionally, request management module 310 transmit to the mapping module 330, an indication of the guest physical address to be mapped.

Depending on the embodiment, request management module 310 may include a buffer to maintain all requests received by the device driver. The buffer may include multiple mapping requests. Request management module 310 may identify multiple mapping requests in the buffer of request management module 310 that are asynchronous mapping requests. Request management module 310 may transmit, to mapping module 330, an indication of the guest physical address of each of the asynchronous mapping requests (e.g., guest physical address(es)). In some embodiments, request management module 310 may receive from virtual address configuration module 320, an indication of a specified number of guest physical address(s) that can be mapped to a virtual address. The specified number may be a predetermined number of guest physical address(es) or a maximum number of guest physical address(es). The maximum number of guest physical address(es) may be based on a huge page size divided by the standard page size.

Request management module 310 may receive, from device driver, a request (e.g., unmapping request) to unmap a physical address. Request management module 310 may transmit, to mapping invalidation module 340, an indication of the guest physical address associated with the unmapping request.

Virtual address configuration module 320 receives from request management module 310, the indication of the type of mapping request. Virtual address configuration module 320, for a synchronous mapping request, identifies (or obtains) a virtual memory referencing a memory page having a standard page size (e.g., 4 KB). Virtual address configuration module 320, for an asynchronous mapping request, identifies (or obtains) a virtual memory referencing a memory page having a huge page size (e.g., 2 MB or 1 GB). Virtual address configuration module 320 transmit, to mapping module 330, an indication of the virtual address based on the received indication of the type of mapping request. As noted above, the specified number of guest physical address(es) that can be mapped to a virtual address that is provided to request management module 310 may also be provided to mapping module 330.

Mapping module 330 receives an indication of the virtual address from virtual address configuration 320 and an indication of the guest physical address from request management module 310. Mapping module 330 generates a record which maps the virtual address indicated by virtual address configuration 320 to the guest physical address(es) indicated by request management module 310. The record may also include a mappings counter reflecting the specified number of guest physical address(es) received from the virtual address configuration module 320. Mapping module 330 stores the record in a page table of an IOMMU (e.g., IOMMU page table), similar to the IOMMU of FIG. 1.

Mapping invalidation module 340 may receive from request management module 310, a guest physical address associated with an unmapping request. Mapping invalidation module 340 may query the IOMMU page table to identify each record (or mapping) that includes the guest physical address (e.g., identified records).

Mapping invalidation module 340 may identify each record of the identified records in which a virtual address is mapped to multiple guest physical addresses. In some embodiments, mapping invalidation module 340 may identify the subset of the identified records each record of the identified in which the virtual address is mapped to multiple guest physical addresses by analyzing the page size of the memory page associated with the virtual address (e.g., identify whether it is a huge page size or a standard page size). In some embodiments, mapping invalidation module 340 may identify each record of the identified in which the virtual address is mapped to multiple guest physical addresses by identifying each record with a mappings counter.

Mapping invalidation module 340, for each record of the identified records in which a virtual address is mapped to multiple guest physical addresses, may unmap the physical address from the virtual address associated with a respective record. Mapping invalidation module 340 may further decrease the mappings counter associated with the respective record. Mapping invalidation module 340 may monitor the IOMMU page table for any record in which the mappings counter has been reduced to zero. Any record in which the mappings counter has been reduced to zero, mapping invalidation module 340 invalidates the record. Thus, the record can no longer be used for translation.

Figure 4:
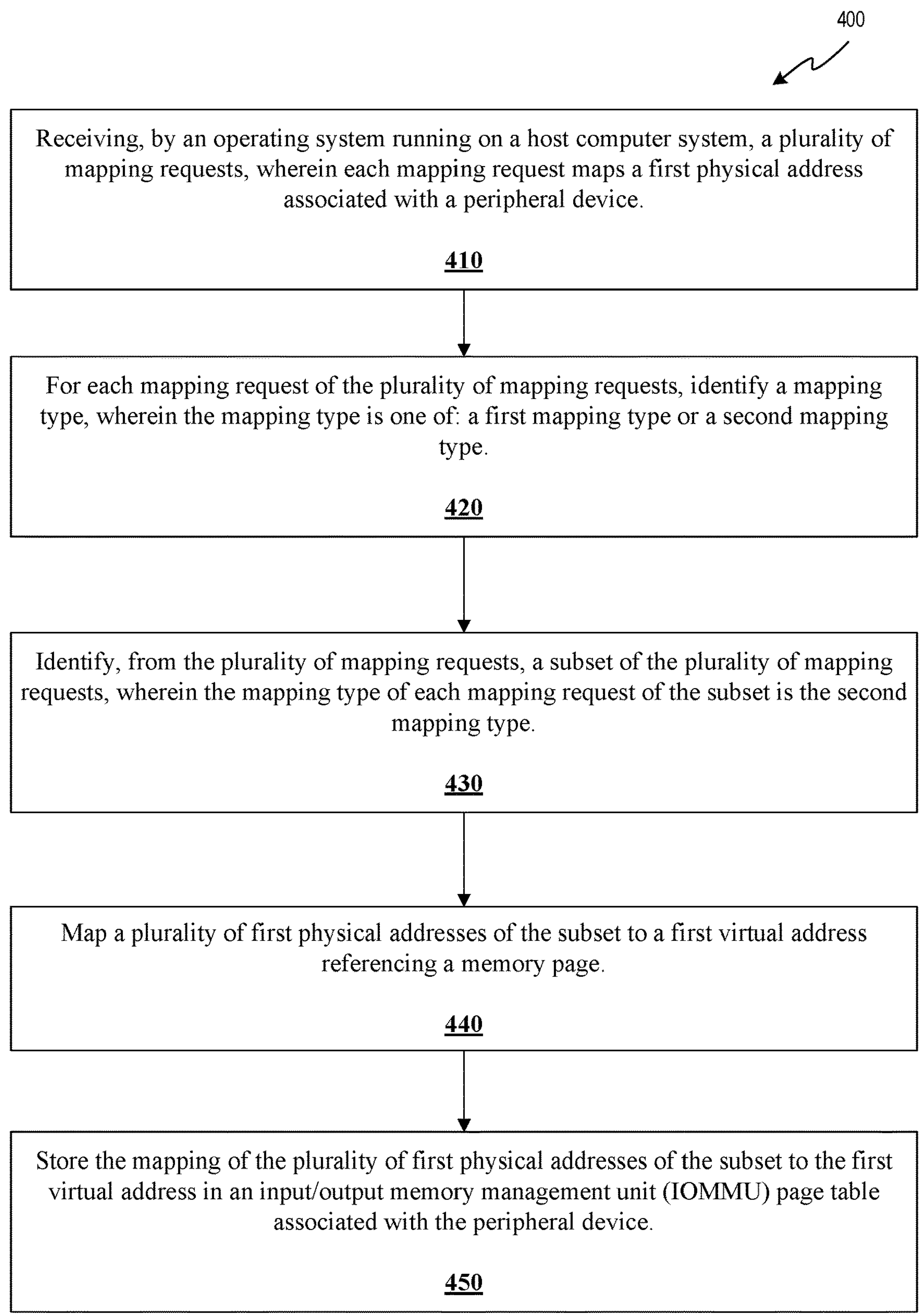
FIG. 4 depicts a flow diagram of an example method for dynamic direct memory access mapping, in accordance with one or more aspects of the present disclosure.

FIG. 4 depicts a flow diagram of one illustrative example of a method 400 for dynamic direct memory access mapping, in accordance with one or more aspects of the present disclosure. Method 400 may be similar to method 400 and may be performed in the same or a similar manner as described above in regard to method 400. Method 400 may be performed by processing devices of a virtual machine or a device driver and may begin at block 410.

At block 410, a processing device receiving, by an operating system running on a host computer system, a plurality of mapping requests, wherein each mapping request maps a first physical address associated with a peripheral device.

Each mapping request of the plurality of mapping requests includes a mapping flag indicating the mapping type. At block 420, for each mapping request of the plurality of mapping requests, the processing device identifies a mapping type. The mapping type may be one of a first mapping type (e.g., synchronous mapping type) or a second mapping type (e.g., asynchronous mapping type). As previously described, the synchronous mapping type refers to a type of mapping that provides device driver and PCI device access to data associated with the mapping, and asynchronous mapping refers to a type of mapping that solely provides PCI device access to data associated with the mapping. Access to the data associated with the mapping of asynchronous mapping type is accessible by the device driver once the mapping is unmapped (or invalidated).

At block 430, the processing device identifies, from the plurality of mapping requests, a subset of the plurality of mapping requests. The mapping type of each mapping request of the subset is the second mapping type (e.g., asynchronous mapping type). The subset may be determined based on a page size of the memory page referenced by the first virtual address (e.g., second page size). As previously described, the subset may be based on the second page size divided by a memory page size of a physical address associated with a mapping request of the plurality of mapping request (e.g., maximum number of mapping request). The subset may be a predetermined number of mapping requests. As previously described, the predetermined number may be any value that does not exceed the maximum number of mapping request.

At block 440, the processing device maps a plurality of first physical addresses of the subset to a first virtual address referencing a memory page. In some embodiments, a mapping counter may be added to the mapping. The mappings counter indicates a number of mapping request included in the subset. At block 450, the processing device stores the mapping of the plurality of first physical addresses of the subset to the first virtual address in an input/output memory management unit (IOMMU) page table associated with the peripheral device. In some embodiment, the mapping counter is stored with the mapping in the IOMMU page table.

In some embodiments, the processing device receiving a request to unmap a second physical address. The processing device identifies, in the IOMMU page table, at least one mapping of the second physical address. Responsive to determining that the second physical address is one physical address of a plurality of physical addresses mapped to a second virtual address associated with the at least one mapping of the second physical address, the processing device unmaps the second physical address from the second virtual address. As previously described, the mappings counter associated with the mapping is decreased for each second physical address that is unmapped from the second virtual address.

Responsive to determining that each physical address of the plurality of physical addresses mapped to the second virtual address is unmapped, the processing device invalidates, in the IOMMU page table, the at least one mapping of the second physical address. As previously described, the mappings counter will be reduced to zero once each physical address of the plurality of physical addresses is unmapped from the second virtual address.

Figure 5:
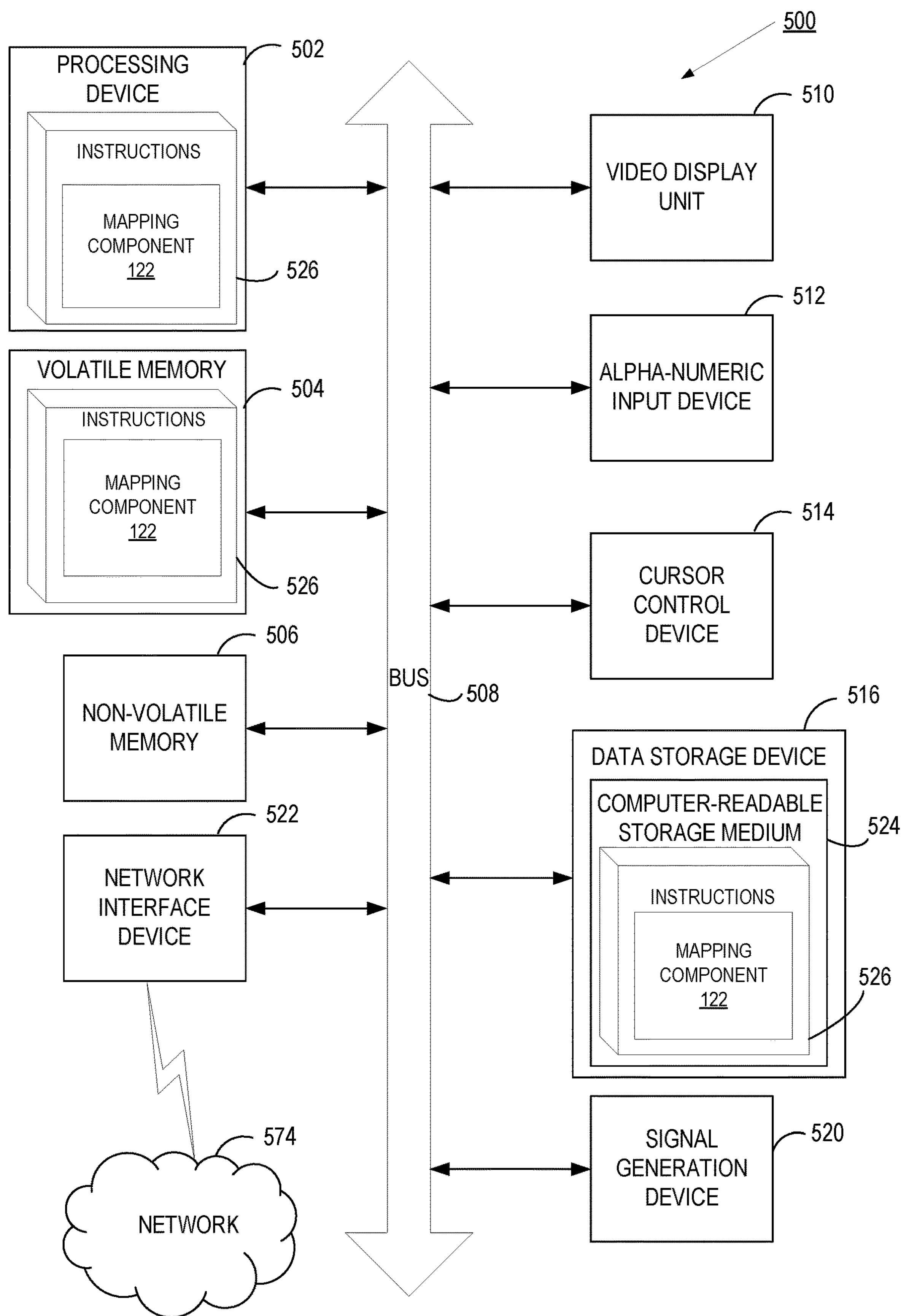
FIG. 5 depicts a block diagram of an example computer system operating in accordance with one or more aspects of the present disclosure.

FIG. 5 depicts a block diagram of a computer system operating in accordance with one or more aspects of the present disclosure. In various illustrative examples, computer system 500 may correspond to computing environment 100 of FIG. 1. Computer system 500 may be included within a data center that supports virtualization. Virtualization within a data center result in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for implementing method 500.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general-purpose computer system selectively programmed by a computer program stored in the computer system. Such a computer program may be stored in a computer-readable tangible storage medium.

The methods and illustrative examples described herein are not inherently related to any particular computer or other apparatus. Various general-purpose systems may be used in accordance with the teachings described herein, or it may prove convenient to construct more specialized apparatus to perform method 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:

receiving, by an operating system running on a host computer system, a plurality of mapping requests, wherein each mapping request maps a first physical address associated with a peripheral device;

for each mapping request of the plurality of mapping requests, identifying a mapping type, wherein the mapping type is selected from a group comprising a first mapping type and a second mapping type;

identifying, from the plurality of mapping requests, a subset of the plurality of mapping requests, wherein the subset is a predetermined number of mapping requests, and wherein the mapping type of each mapping request of the subset is the second mapping type;

mapping a plurality of first physical addresses of the subset to a first virtual address referencing a memory page, wherein the predetermined number of mapping requests is determined based on a page size of the memory page referenced by the first virtual address; and storing the mapping of the plurality of first physical addresses of the subset to the first virtual address in an input/output memory management unit (IOMMU) page table associated with the peripheral device.

2. The method of claim 1, wherein each of the plurality of mapping requests includes a mapping flag indicating the mapping type.

3. The method of claim 1, wherein the page size is 1 gigabyte.

4. The method of claim 1, further comprising:

receiving a request to unmap a second physical address;

identifying, from the IOMMU page table, at least one mapping of the second physical address; and responsive to determining that the second physical address is one physical address of a plurality of physical addresses mapped to a second virtual address associated with the at least one mapping of the second physical address, unmapping the second physical address from the second virtual address.

5. A system comprising:

a memory device;

a processing device, operatively coupled to the memory device, to perform operations comprising:

receiving, by an operating system running on a host computer system, a plurality of mapping requests, wherein each mapping request maps a first physical address associated with a peripheral device;

for each mapping request of the plurality of mapping requests, identifying a mapping type, wherein the mapping type is selected from a group comprising a first mapping type and a second mapping type;

identifying, from the plurality of mapping requests, a subset of the plurality of mapping requests, wherein the subset is a predetermined number of mapping requests, and wherein the mapping type of each mapping request of the subset is the second mapping type;

mapping a plurality of first physical addresses of the subset to a first virtual address referencing a memory page, wherein the predetermined number of mapping requests is determined based on a page size of the memory page referenced by the first virtual address; and storing the mapping of the plurality of first physical addresses of the subset to the first virtual address in an input/output memory management unit (IOMMU) page table associated with the peripheral device.

6. The system of claim 5, wherein each of the plurality of mapping requests to map the physical address includes a mapping flag indicating the mapping type.

7. The system of claim 5, wherein the second page size is 1 gigabyte.

8. The system of claim 5, wherein the processing device is to perform further operations comprising:

receiving a request to unmap a second physical address;

identifying, from the IOMMU page table, at least one mapping of the second physical address; and responsive to determining that the second physical address is one physical address of a plurality of physical addresses mapped to a second virtual address associated with the at least one mapping of the second physical address, unmapping the second physical address from the second virtual address.

9. A non-transitory computer-readable storage medium including instructions that, when executed by a processing device, cause the processing device to perform a method comprising:

receiving, by an operating system running on a host computer system, a plurality of mapping requests, wherein each mapping request maps a first physical address associated with a peripheral device;

for each mapping request of the plurality of mapping requests, identifying a mapping type, wherein the mapping type is selected from a group comprising: a first mapping type and a second mapping type;

identifying, from the plurality of mapping requests, a subset of the plurality of mapping requests, wherein the subset is a predetermined number of mapping requests, and wherein the mapping type of each mapping request of the subset is the second mapping type;

mapping a plurality of first physical addresses of the subset to a first virtual address referencing a memory page, wherein the predetermined number of mapping requests is determined based on a page size of the memory page referenced by the first virtual address;

storing the mapping of the plurality of first physical addresses of the subset to the first virtual address in an input/output memory management unit (IOMMU) page table associated with the peripheral device.

10. The non-transitory computer-readable storage medium of claim 9, wherein each mapping request of the plurality of mapping requests includes a mapping flag indicating the mapping type.

11. The non-transitory computer-readable storage medium of claim 9, wherein the processing device is to perform methods further comprising:

receiving a request to unmap a second physical address;

identifying, in the IOMMU page table, at least one mapping of the second physical address; and responsive to determining that the second physical address is one physical address of a plurality of physical addresses mapped to a second virtual address associated with the at least one mapping of the second physical address, unmapping the second physical address from the second virtual address.

12. The non-transitory computer-readable storage medium of claim 11, wherein the processing device is to perform methods further comprising:

responsive to determining that each physical address of the plurality of physical addresses mapped to the second virtual address is unmapped, invalidating, in the IOMMU page table, the at least one mapping of the second physical address.

* * * * *